United States Patent
Chen et al.

(10) Patent No.: US 8,976,307 B2
(45) Date of Patent: Mar. 10, 2015

(54) PATTERNED RETARDER 3D LIQUID CRYSTAL DISPLAY AND THE MANUFACTURING METHOD THEREOF

(71) Applicant: Shenzhen China Star Optoelectronics Technology Co., Ltd., Shenzhen, Guangdong (CN)

(72) Inventors: Cheng-hung Chen, Shenzhen (CN); Zui Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 90 days.

(21) Appl. No.: 13/696,068

(22) PCT Filed: Oct. 17, 2012

(86) PCT No.: PCT/CN2012/083056
§ 371 (c)(1),
(2) Date: Nov. 3, 2012

(87) PCT Pub. No.: WO2014/043966
PCT Pub. Date: Mar. 27, 2014

(65) Prior Publication Data
US 2014/0247407 A1    Sep. 4, 2014

(51) Int. Cl.
*G02F 1/1335*    (2006.01)
*G02F 1/1333*    (2006.01)
*G02B 27/26*    (2006.01)
*H04N 13/04*    (2006.01)
*G02F 1/13363*    (2006.01)

(52) U.S. Cl.
CPC .............. *G02B 27/26* (2013.01); *G02F 1/1335* (2013.01); *H04N 13/0409* (2013.01); *G02F 1/133512* (2013.01); *G02F 1/13363* (2013.01)
USPC ................................ 349/15; 349/110; 349/96

(58) Field of Classification Search
USPC .......................................................... 349/15
See application file for complete search history.

(56) References Cited

U.S. PATENT DOCUMENTS

2013/0010218 A1* 1/2013 Son et al. ........................ 349/15

* cited by examiner

*Primary Examiner* — Wen-Ying P Chen
(74) *Attorney, Agent, or Firm* — Andrew C. Cheng

(57) ABSTRACT

A patterned retarder 3D liquid crystal display is disclosed. The liquid crystal display includes a display panel, a polarizer, and a patterned retarder film. The display panel includes a first substrate and a second substrate spaced apart from each other. The second substrate includes an up stutter and a down surface, and the up surface is farther to the first substrate than the down surface. A black matrix is arranged on the down surface of the second substrate. A mask is arranged on a first surface or the second surface of the polarizer. The first surface of the polarizer is adjacent to the patterned retarder film and the second surface of the polarizer is adjacent to the second substrate. The mask corresponds to portions of the black matrix. In addition, a manufacturing method of the patterned retarder 3D liquid crystal display is also disclosed.

6 Claims, 3 Drawing Sheets

PATTERNED RETARDER 3D LIQUID CRYSTAL DISPLAY AND THE MANUFACTURING METHOD THEREOF

BACKGROUND OF THE INVENTION

1. Field of the Invention

Embodiments of the present disclosure relate to display technology, and more particularly to a patterned retarder 3D liquid crystal display and the manufacturing method thereof.

2. Discussion of the Related Art

Film-type patterned retarder (FPR) is an imagining method of current 3D liquid crystal displays. As shown in FIG. 1, the FPR 3D display system includes a display panel 10, a polarizer 20 and a patterned retarder film 30. The patterned retarder film 30 of the FPR 3D display system divides a 3D image into a left eye image 41 and a right eye image 42. The left eye image 41 and the right eye image 42 are transmitted to the left eye and the right eye of viewers. The images are then composed in the brain of the viewer after being received.

However, viewing angles of the FPR 31.) display system are restricted. As shown in FIG. 1, the X-talk exists when the viewer is viewing the 3D image at a large viewing angle. For example, the right eye image 42 not only is transmitted to the right eye, but also observed by the right eye. As such, the X-talk problems result in a bad display performance.

Usually, one solution regarding the X-talk is to increase a width of a black hand of black matrix (BM) between a left eye pixel and a right eye pixel. However, the transmission rate may be greatly reduced when the width of the black band is too large.

SUMMARY

The object of the claimed invention is to provide a patterned retarder 3D liquid crystal display and the manufacturing method thereof. In the 3D display mode, the X-talk of the liquid crystal display with wide viewing angle characteristics may be reduced. Also, the transmission rate and the aperture rate may be increased.

In one aspect, a patterned retarder 3D liquid crystal display includes a display panel, a polarizer, and a patterned retarder film. The display panel includes a first substrate and a second substrate spaced apart from each other. The second substrate includes an up surface and a down surface, and the up surface is farther to the first substrate than the down surface. Wherein the polarizer and the patterned retarder film are arranged on the up surface of the second substrate in turn. A black matrix is arranged on the down surface of the second substrate. A mask is arranged on a first surface or a second surface of the polarizer, the first surface of the polarizer is adjacent to the patterned retarder film and the second surface of the polarizer is adjacent to the second substrate. The mask corresponds to portions of the black matrix. And a center of the mask aligns with a center of the black matrix.

Wherein the mask includes a plurality of mask bands arranged along a row direction of the display panel, and each of the mask bands correspond to black hands of the black matrix.

Wherein the mask is a masking matrix corresponding to the black matrix.

In another aspect, a patterned retarder 3D liquid crystal display includes a display panel, a polarizer, and a patterned retarder film. The display panel includes a first substrate and a second substrate spaced apart from each other, and the second substrate includes an up surface and a down surface. The up surface is farther to the first substrate than the down surface. Wherein the polarizer and the patterned retarder film are arranged on the up surface of the second substrate in turn. A black matrix is arranged on the down surface of the second substrate. A mask is arranged on a first surface or a second surface of the polarizer, the first surface of the polarizer is adjacent to the patterned retarder film and the second surface of the polarizer is adjacent to the second substrate. And the mask corresponds to portions of the black matrix.

Wherein the mask includes a plurality of mask hands arranged along a row direction of the display panel, and each of the mask bands correspond to black bands of the black matrix.

Wherein the mask is a masking matrix corresponding to the black matrix.

Wherein the polarizer and the patterned retarder film are arranged on the up surface of the second substrate in turn, the mask is arranged on the first surface of the polarizer, and the first surface is adjacent to the patterned retarder film.

Wherein the polarizer and the patterned retarder film are arranged on the up surface of the second substrate in turn, the mask is arranged on the second surface of the polarizer, and the second surface is adjacent to the second substrate.

In another aspect, a manufacturing method of a patterned retarder 3D liquid crystal display includes: forming a first substrate and a second substrate; assembling the first substrate and the second substrate to be spaced apart from each other so as to farm the liquid crystal panel; arranging a polarizer and a patterned retarder film on an up surface of the second substrate in turn; and wherein a black matrix is formed on a down surface of the second substrate, the down surface is closer to the first substrate than the up surface, a mask is arranged on a first surface or a second surface of the polarizer, the first surface of the polarizer is adjacent to the patterned retarder film and the second surface of the polarizer is adjacent to the second substrate, and the mask corresponds to portions of the black matrix.

Wherein the mask includes a plurality of mask bands arranged along a row direction of the display panel, and each of the mask bands correspond to black bands of the black matrix.

Wherein the mask is a masking matrix corresponding to the black matrix.

Wherein the polarizer and the patterned retarder film are arranged on the up surface of the second substrate in turn, the mask is arranged on the first surface of the polarizer, and the first surface is adjacent to the patterned retarder film.

Wherein the polarizer and the patterned retarder film are arranged on the up surface of the second substrate in turn, the mask is arranged on the second surface of the polarizer, and the second surface is adjacent to the second substrate.

DETAILED DESCRIPTION OF THE EMBODIMENTS

Embodiments of the invention will now be described more fully hereinafter with reference to the accompanying drawings, in which embodiments of the invention are shown.

Figure 1:
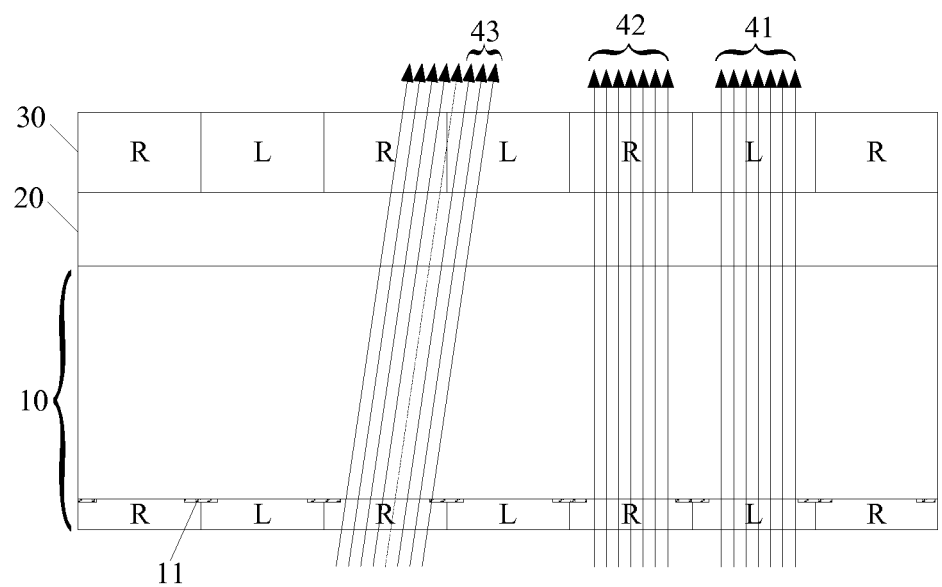
FIG. 1 is a schematic view of as typical FPR 3D display system.
Figure 2:
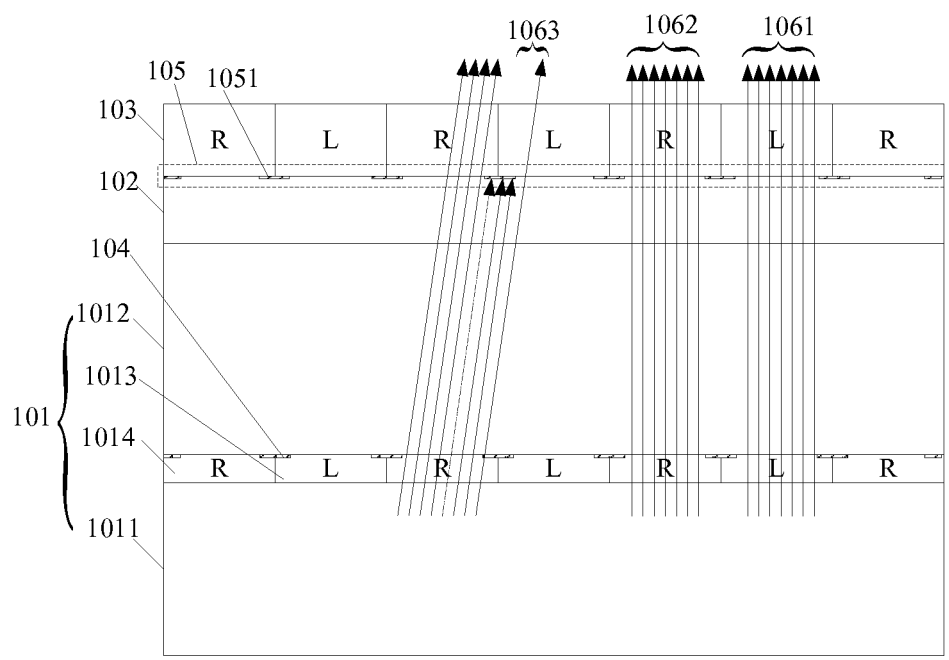
FIG. 2 is a schematic view of a FPR 3D liquid crystal display in accordance with one embodiment.

FIG. 2 is a schematic view of a FPR 3D liquid crystal display in accordance with one embodiment of the claimed invention. The FPR 3D liquid crystal display includes a display panel 101, a polarizer 102, and a patterned retarder film 103.

The display panel 101 includes a first substrate 1011 and a second substrate 1012 spaced apart from each other. The first substrate 1011 is an array substrate, and the second substrate 1012 is a color filter substrate. The first substrate 1011 and the second substrate 1012 are assembled to form the display panel 101. In addition, a liquid crystal layer (not shown) is arranged between the first substrate 1011 and the second substrate 1012.

The display panel 101 may be divided into a plurality of left pixels 1013 for displaying the left eye image and a plurality of right pixels 1014 for displaying the right eye image.

The second substrate 1012 includes an up surface and a down surface, and the up surface is farther to the first substrate 1011 than the down surface. The polarizer 102 and the patterned retarder film 103 are arranged on the up surface of the second substrate 1012 in turn.

A black matrix 104 is arranged on the down surface of the second substrate 1012. In addition, the location of the black matrix 104 corresponds to the location between the left pixels 1013 and the right pixels 1014. The polarizer 102 is arranged between the patterned retarder film 103 and the second substrate 1012. A mask 105 is arranged on a first surface of the polarizer 102 adjacent to the patterned retarder film 103. In the embodiment, the mask 105 corresponds to the black matrix 104 and includes a plurality of mask bands 1051 arranged along a row direction of the display panel 101. The mask bands 1051 respectively correspond to black bands of the black matrix 104. It is to be understood that each of the mask bands 1051 corresponds to one black band of the black matrix 104, and a center of the mask bands 1051 aligns with a center of the black matrix 104 so as to obtain a better masking effect.

The beams of the 3D image displayed by the display panel 101 are divided into two beams respectively corresponding to the left eye image and the right eye image after passing through the patterned retarder film 103. That is, the patterned retarder film 103 divides the 3D image into one vertically polarized image and one horizontally polarized image. The left eye image and the right eye image are obtained after the beams of the vertically polarized image and the horizontally polarized image passing through polarized lens (not shown).

Under a 3D display mode, the viewer may easily receive wrong beams when the viewer is viewing the 3D image at a large viewing angle. As shown in FIG. 2, the mask bands 1051 partially block the wrong beams and may operate cooperatively with the black matrix 104 so as to reduce the X-talk.

Specifically, the corresponding beams of the left eye image 1061 and the right eye image 1062 may be observed correctly when the viewer faces toward the liquid crystal display. However, the X-talk exists when the corresponding beams of the right eye image 1063 are transmitted to the left eye of the viewer. The width of the black matrix 104 is increased so that the black matrix 104 is capable of blocking the wrong beams.

The mask bands 1051 of the mask 105 are capable of blocking the wrong beams. In addition, the mask 105 also achieves the same effect with the black matrix 104 for the reason that the mask hands 1051 of the mask 105 are arranged corresponding to the black bands of the black matrix 104 in the row direction. Therefore, the mask bands 1051 are capable of blocking the wrong beams so that the width of the black matrix 104 has not to be increased at the large viewing angle. As shown in FIG. 2, portions of the corresponding beams of the right eye image 1063 are blocked by the mask bands 1051 so that the X-talk is reduced. In addition, as the width of black matrix 104 has not to be greatly increased, the aperture rate and the transmission rate are increased.

In other embodiments, the mask 105 may be a masking matrix corresponding to the black matrix 104. The structure of the masking matrix may be substantially the same with the black matrix 104.

In addition, the manufacturing process of the polarizer 102 is easier as the mask 105 may be arranged on the polarizer 102 easily.

In one embodiment, the mask 105 is arranged on the first surface of the polarizer 102 adjacent to the patterned retarder film 103. In other embodiments, the mask 105 is arranged on a second surface of the polarizer 202, and the second surface is adjacent to the second substrate 203. Specifically, the mask 201 is arranged on the second surface of the polarizer 202, and the second surface is adjacent to the second substrate 203. The mask 201 includes a plurality of mask bands 2021 corresponding to black bands of the black matrix 204 in the row direction.

Figure 3:
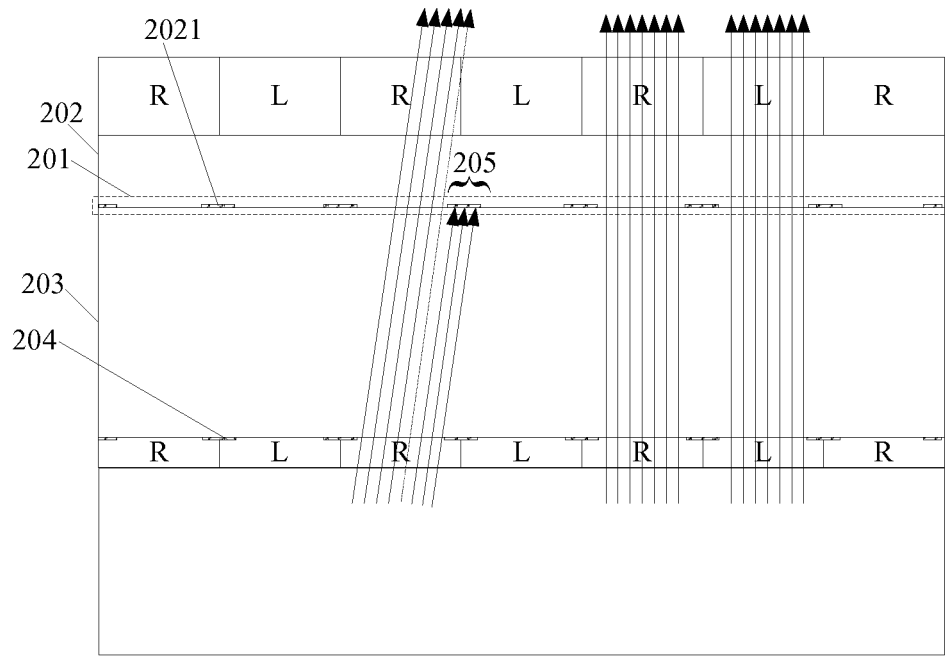
FIG. 3 is a schematic view of a FPR 3D liquid crystal display in accordance with another embodiment.

Under a 3D display mode, the viewer may easily receive wrong beams when the viewer is viewing the 3D image at a large viewing angle. As shown in FIG. 3, the right eye image 205 is transmitted to the left eye of the viewer so that the X-talk exists. The mask bands 2021 of the mask 201 arranged on the second surface of the polarizer 202 are capable of blocking wrong beams as the black matrix 204. Therefore, the mask 201 is capable of blocking the wrong beams so that the width of the black matrix 104 has not to be increased.

It is to be understood that the mask 201 arranged on the second surface of the polarizer 202 may be the masking matrix corresponding to the black matrix. The masking matrix is substantially the same with the black matrix 204.

Figure 4:
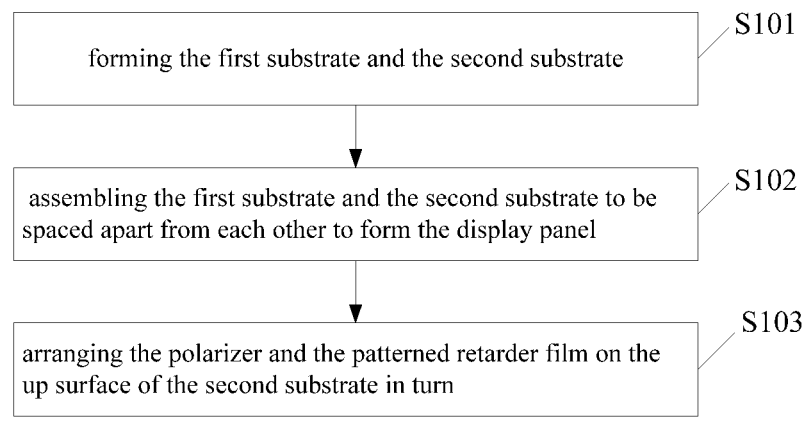
FIG. 4 is a flowchart of a manufacturing method of FPR 3D liquid crystal display.

FIG. 4 is a flowchart of a manufacturing method of FPR 3D liquid crystal display. The method includes the following steps. In step S101, the first substrate and the second substrate are formed. The manufacturing processes of the display panel include an array manufacturing process, an assembly process, and a module manufacturing process. The array substrate is formed in the array manufacturing process. In the array manufacturing process, the first substrate 1011 and the second substrate 1012 are formed. The first substrate 1011 is the array substrate, and the second substrate 1012 is the color filter substrate.

In step S102, the first substrate and the second substrate are assembled to be spaced apart from each other to form the display panel.

After the step S102 is executed, the assembly process begins. Liquid crystals flow into a space between the first substrate 1011 and the second substrate 1012 so as to form the liquid crystal layer. Before the first substrate 1011 and the second substrate 1012 are bonded together, the black matrix 104 is formed on the down surface of the second substrate 1012, wherein the down surface is closer to the display panel first substrate 1011 than the up surface. The locations of portions of the black matrix 104 correspond to the locations between the left pixels 1013 and the right pixels 1014.

In the module manufacturing process, the glass substrate assembled in the assembly process, and other components such as backlight plates and circuits are assembled to form the display panel 101.

In step S103, the polarizer 102 and the patterned retarder film 103 are arranged on the up surface of the second substrate in turn so as to firm the beams corresponding to the left eye image and the right eye image under the 3D display mode. The display surface of the display panel 101 is the up surface of the second substrate 1012. In other embodiments, the polarizer 102 and the patterned retarder film 103 may be formed on other layers only if the polarizer 102 and the patterned retarder film 103 are formed on the surface that is farther to the first substrate 1011 than the other surface. Before the patterned retarder film 103 is formed, the mask 105 is formed on a first surface of the polarizer 102 adjacent to the patterned retarder film 103, and the mask 105 at least partially corresponds to the black matrix 104.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A patterned retarder 3D liquid crystal display, comprising:
   a display panel comprising a first substrate and a second substrate spaced apart from each other, and the second substrate comprises an up surface and a down surface, and the up surface is farther to the first substrate than the down surface;
   a polarizer;
   a patterned retarder film; and
   wherein the polarizer and the patterned retarder film are arranged on the up surface of the second substrate in turn, a black matrix is arranged on the down surface of the second substrate, a mask is arranged on a second surface of the polarizer, the second surface of the polarizer is adjacent to the second substrate, and the mask corresponds to portions of the black matrix.

2. The liquid crystal display as claimed in claim 1, wherein the mask comprises a plurality of mask bands arranged along a row direction of the display panel, and each of the mask bands correspond to black bands of the black matrix.

3. The liquid crystal display as claimed in claim 1, wherein the mask is a masking matrix corresponding to the black matrix.

4. A manufacturing method of a patterned retarder 3D liquid crystal display, comprising:
   forming a first substrate and a second substrate;
   assembling the first substrate and the second substrate to be spaced apart from each other so as to form the liquid crystal panel;
   arranging a polarizer and a patterned retarder film on an up surface of the second substrate in turn; and
   wherein a black matrix is formed on a down surface of the second substrate, the down surface is closer to the first substrate than the up surface, a mask is arranged on a second surface of the polarizer, the second surface of the polarizer is adjacent to the second substrate, and the mask corresponds to portions of the black matrix.

5. The manufacturing method as claimed in claim 4, wherein the mask comprises a plurality of mask bands arranged along a row direction of the display panel, and each of the mask bands correspond to black bands of the black matrix.

6. The manufacturing method as claimed in claim 4, wherein the mask is a masking matrix corresponding to the black matrix.

\* \* \* \* \*